Figure 4:
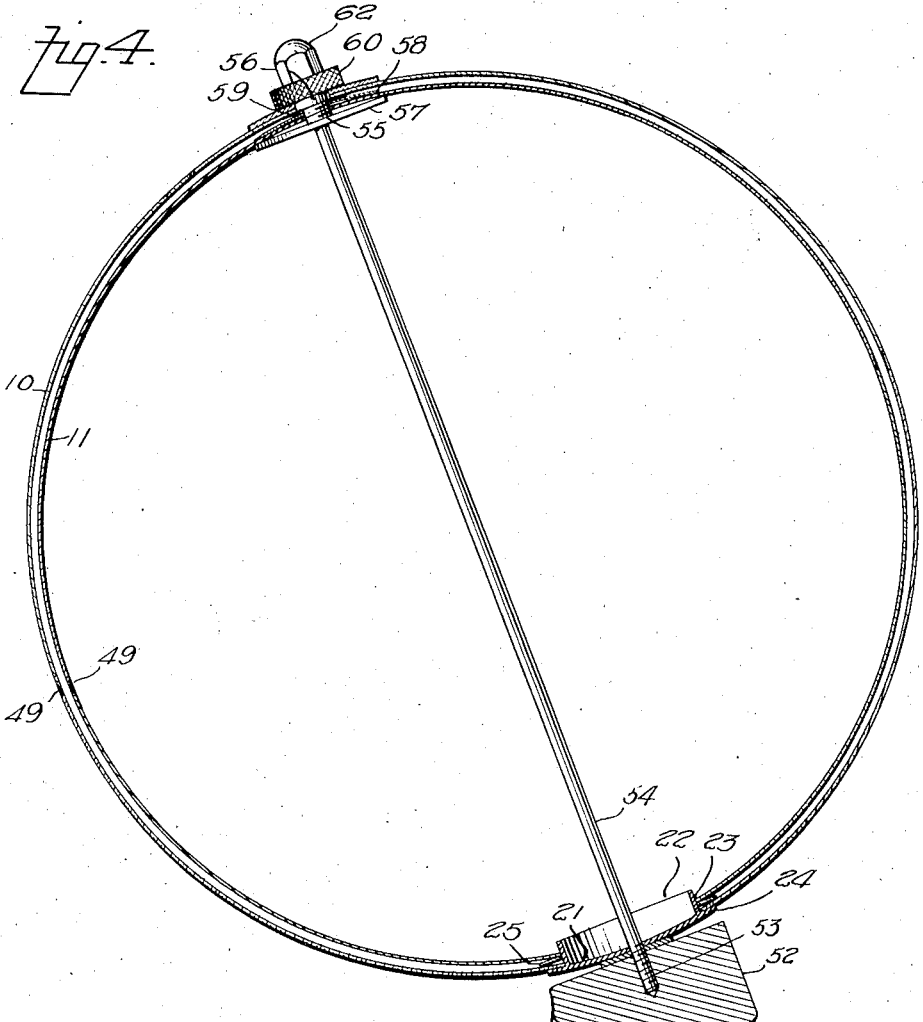

Aug. 8, 1944.  W. F. KOCH  2,355,304
WORLD GLOBE
Filed March 29, 1943  3 Sheets-Sheet 1
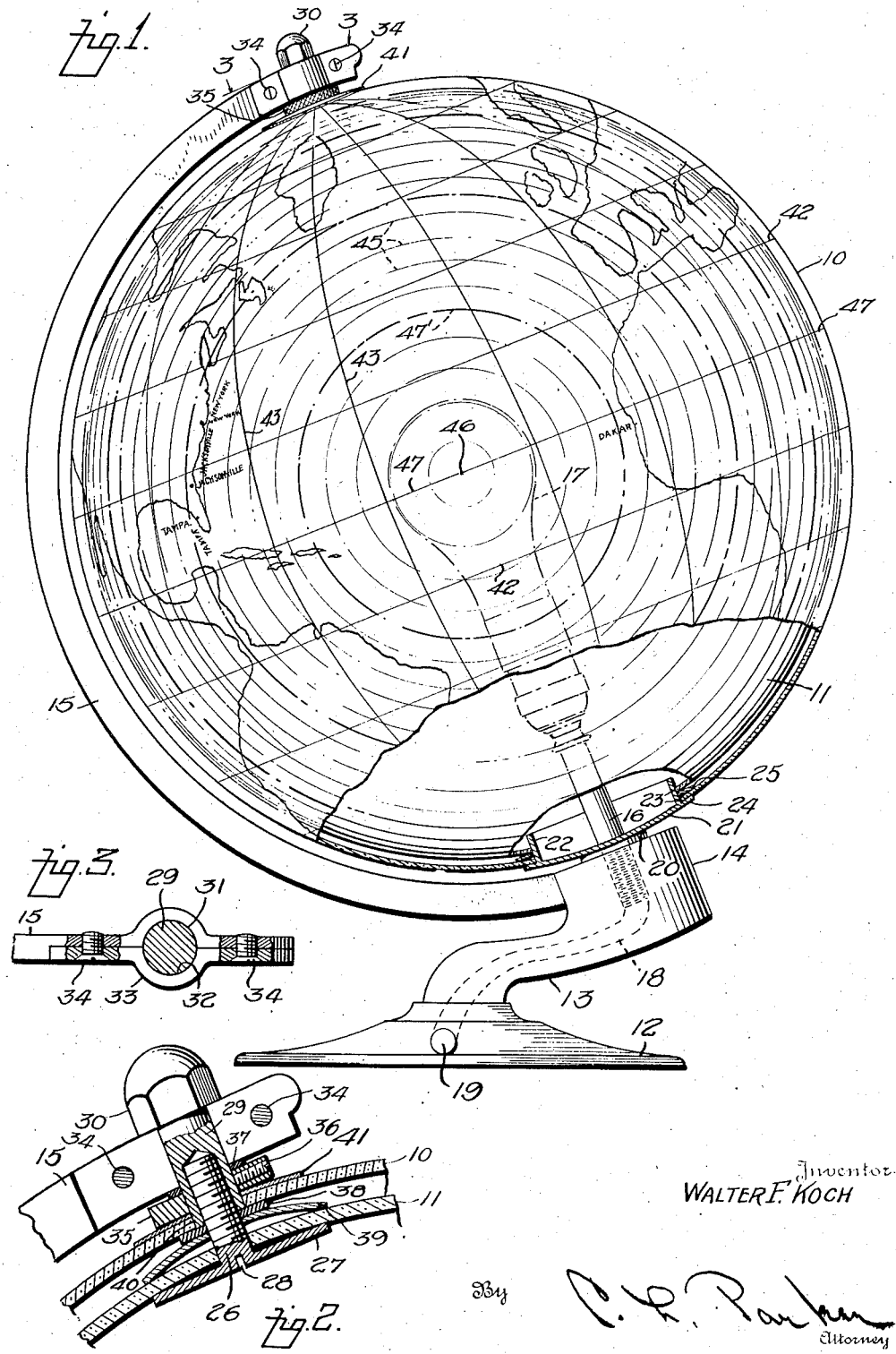

Aug. 8, 1944.  W. F. KOCH  2,355,304
WORLD GLOBE
Filed March 29, 1943   3 Sheets-Sheet 2

Inventor
WALTER F. KOCH
By C. L. Parker
Attorney

Aug. 8, 1944.　　　W. F. KOCH　　　2,355,304
WORLD GLOBE
Filed March 29, 1943　　　3 Sheets-Sheet 3

Inventor
WALTER F. KOCH

Patented Aug. 8, 1944

2,355,304

UNITED STATES PATENT OFFICE 2,355,304

WORLD GLOBE

Walter F. Koch, Jacksonville, Fla.

Application March 29, 1943, Serial No. 480,981

8 Claims. (Cl. 35—46)

This invention relates to world globes.

An important object of the invention is to provide two globes, one within the other, and independently rotatable to facilitate the ascertaining of information which cannot readily be obtained from a conventional globe of the type now in use.

A further object is to provide such a globe structure wherein the two globes are concentric and one is provided with certain markings whereby the relative rotation of the globes will facilitate the ascertaining of certain information, for example, the approximate distance between different places on the globes.

A further object is to provide a device of the character referred to wherein the globes are concentric and wherein one globe is provided with equidistantly spaced concentric lines having their common center lying on the Equator, whereby relative rotation of the globe until the center of such concentric circles lies on a great circle passing through any two given points on the globe, permits the approximate distance between such two points to be ascertained, the concentric circles being spaced apart a given scaled distance.

A further object is to provide a globe structure of the character referred to wherein means externally of the structure is readily operable for rotating the inner globe.

A further object is to provide such a structure wherein both globes are at least translucent, and to provide a source of illumination within the globes to facilitate the reading thereof.

Other objects and advantages of the invention will become apparent during the course of the following description.

In the drawings I have shown two embodiments of the invention. In this showing—

Figure 5:
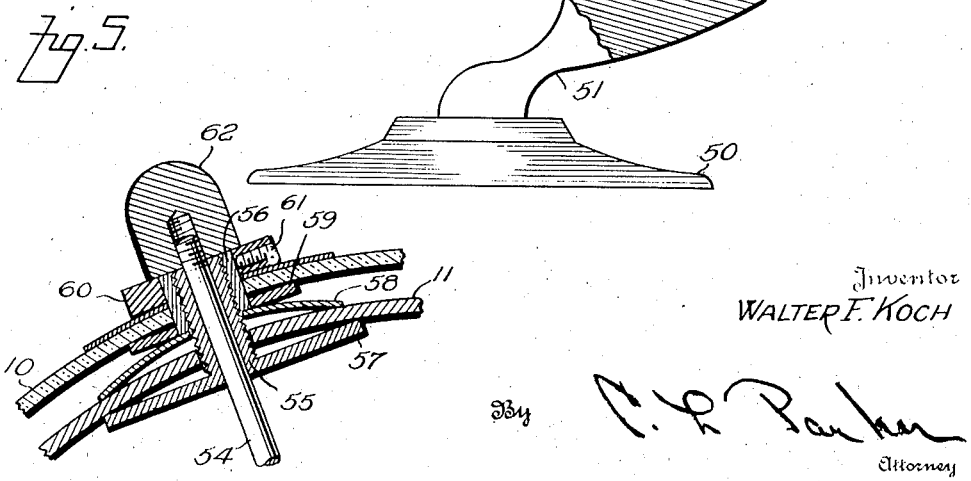
Figure 6:
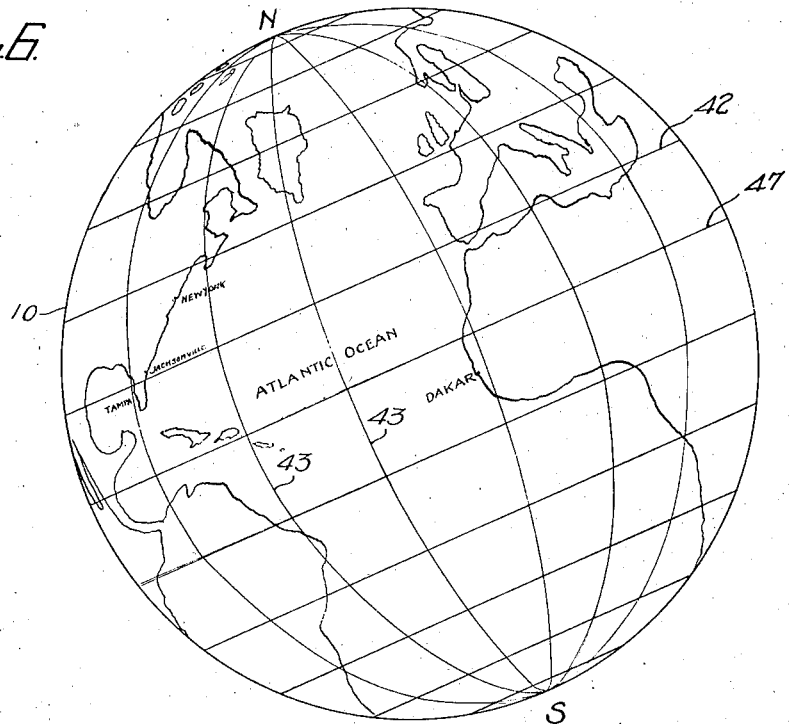
Figure 7:
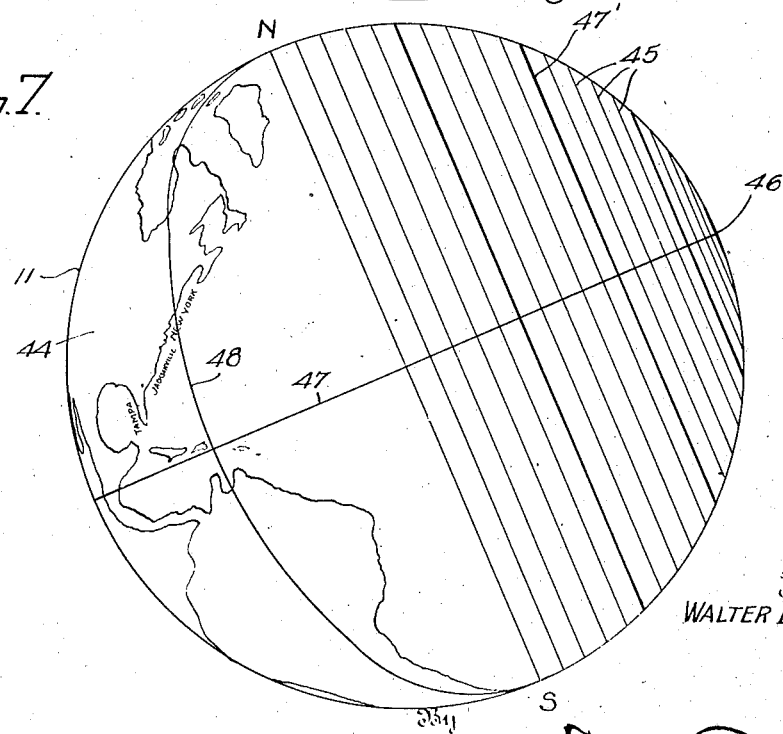

Figure 1 is a side elevation of one form of the invention, the structure being such that the globe has its axis tilted in accordance with the actual position of the world relative to the sun, the lower portion of the globe being broken away, Figure 2 is an enlarged fragmentary sectional view through the upper axial portion of the globe, parts being shown in elevation, Figure 3 is a detailed sectional view on lines 3—3 of Figure 1, parts being broken away, Figure 4 is an axial sectional view through a modified form of globe structure, parts being shown in elevation, Figure 5 is an enlarged detail sectional view of the upper axial portion of the globe structure of Figure 4, Figure 6 is a side elevation showing the outer globe of either form of the invention, and Figure 7 is a similar view of the inner globe of either form of the invention.

Referring to Figures 1, 2, 3, 6 and 7, the numeral 10 designates the outer globe and the numeral 11 indicates the inner globe, and these globes in a manner to be described are supported with respect to a common center and to be rotated on the normal axis of rotation passing through the North and South Poles indicated by the letters "N" and "S" in Figures 6 and 7. The two globes may be differently or identically marked, but are preferably marked in the manner to be described. The two globes may be made of any suitable material, preferably one of the numerable presently available plastics. In the form of the invention shown in Figure 1 the inner globe 11 is preferably translucent, and the outer globe 10 may be either transparent or translucent, for the reason which will become apparent.

A supporting base 12 is provided for the globe units and includes an arm 13 having a supporting cylindrical end 14 tilted to correspond to the tilting of the axis of the globes and provided with a semicircular preferably integral supporting arm 15. A pipe 16 has its lower end threaded in the base portion 14 and extending axially into the inner globe to support a light bulb 17. The usual wires from the light bulb extend through the pipe 16 and through a suitable opening 18 in the arm 13 for connection with a conventional switch button 19 carried by the base 12.

A supporting washer 20 rests upon the base portion 14 and a cap 21, which is a section of a sphere, rests upon the washer 20. The cap 21 has a cylindrical flange 22 extending through openings 23 formed in the respective globes 10 and 11 coaxially thereof. The edges of the openings 23 have sliding engagement with the flange 22 so as to permit free rotation of the globes, although it will be apparent that either opening 23 may have its edge in frictional engagement with the flange 22 while the edge of the other opening 23 is movable with respect to the flange 22. The spherical portion of the cap 21 extends beyond the flange 22 as at 24 to act as a support for the globe 10, and a free washer 25 may be arranged between the two globes, surrounding the flange 22, to support the inner globe relative to the outer globe.

Referring to Figure 2, a screw 26 is arranged coaxial with the globes and extends through the inner globe at the North Pole thereof. The screw 26 is provided at its lower end with an outstanding flange 27 engageable against the inner surface of the globe 11 to support such globe at the North Pole thereof. The lower end of the screw 26 is provided with a screwdriver slot 28 for convenience in assembling the parts of the device. The upper end of the screw 26 is received in an internally threaded stem 29 having a nut 30 integral therewith.

The arm 15 is provided with a semi-cylindrical recess 31 (Figure 3) cooperating with a semi-circular recess 32 in a complementary member 33, thus forming a cylindrical opening to receive the stem 29. The complementary member 33 may be secured in position by screws 34. There is no gripping action exerted against the stem 29, and accordingly this stem is free to rotate relative to the arm 15. A knurled separator 35 is arranged between the globe 10 and the upper end of the arm 15, and the separator 35 is fixed to the stem 29 by a set screw 36. A washer 37 is arranged between the separator 35 and the arm 15. It will be apparent that the knurled separator 35 may be turned by hand to rotate the stem 29. The lower end of this stem engages a washer 38 and this washer, in turn, engages a spring washer 39 having its periphery contacting with the surface of the globe 11. Tightening the screw 26 will effect a resilient clamping action between the head 27 and washer 39, whereby rotation of the separator 35 and stem 29 will rotate the inner globe 10. In this connection, it will be noted that the stem 29 extends freely through an opening 40 at the North Pole of the globe 10 and accordingly the two globes are freely rotatable with respect to each other. Obviously, the outer globe may be rotated by hand. If desired, an hour zone indicator 41 may be arranged between the separator 35 and the globe 10 and calibrated to indicate the twenty-four hours of the day.

As previously indicated, the relative markings of the two globes may be identical or substantially different, and the two globes are preferably marked as indicated in Figures 6 and 7. As shown in Figure 6, the outer globe 10 preferably contains a complete map of the world. Inasmuch as this is conventional in itself only one side of the world has been shown in Figure 6 showing portions of the Eastern and Western Hemispheres and the Atlantic Ocean. The globe 10 is also preferably provided with the usual latitude lines 42 to indicate the various zones of the world, and the globe 10 is also preferably provided with the usual lines of longitude 43. The map of the world on the outer globe, as indicated above, is conventional and the usual boundaries of states, provinces and countries may be applied, and different colors may be employed for distinguishing between political subdivisions as is the common practice. It will become apparent, however, that any colors so used should not be dense, but should be relatively transparent for the passage of light therethrough because of the use of the light source 17. As previously stated, the globe 10, in the form of the invention described, may in itself be either transparent or translucent.

The inner globe 11 preferably does not bear a conventional world map. In practice I prefer to show only one hemisphere, such as the Western Hemisphere indicated by the numeral 44. The portion of the globe opposite the hemisphere shown is provided with a series of concentric lines 45 having their common center at the point 46 lying on the Equator 47. The Equator is indicated by the same numeral in Figure 6, and it will be apparent that in any relatively rotated positions of the two globes, the Equators thereof will always coincide. The lines 45 are employed for ascertaining relative distances between points on the outer globe, and accordingly are arranged some arbitrarily selected scaled distance apart. The distance between these lines will depend upon the individual sizes of the device as manufactured. On smaller sizes of the device, for example, twenty of the lines 45 may be employed, in which case the lines will represent a distance of 300 miles between each pair of such lines. In larger size globes, where practicable, sixty of the lines 45 may be employed to represent a distance of 100 miles therebetween. The circular line 45 farthest from the center 46 will pass through the North and South Poles around the circumference of the globe 11, thus representing two complete meridians. For convenience, certain of the lines 45 may be colored or made relatively heavier as indicated by the numeral 47' in Figure 7. This is a matter of convenience in measuring the total distance between two points. For example, in the smaller globes every fifth line 45 may be so distinguished from the other lines to facilitate the counting off of a distance of 1500 miles. In the larger globes wherein the distance between adjacent lines 45 represents 100 miles, every fifth line may be made of a different color or otherwise distinguished from the remaining lines, to facilitate the measuring of distances of 500 miles. The globe 11 also may be provided, preferably on a portion thereof not covered by the lines 45, with a single meridian 48 for a purpose to be described.

In the form of the invention shown in Figures 4 and 5 the globes may be structurally identical with those previously described and accordingly they have been indicated by the same reference numerals. In Figure 4 I have shown one means whereby each globe may be constructed of two hemispheres. As shown, each pair of hemispheres may be provided with an ordinary step or telescoping joint 49 and cement may be applied to secure the hemispheres of each pair together. This means of making the globe is convenient and is shown merely as a suggestion, and it will be obvious that the invention is not limited to any particular method of making or assembling the globes.

In the form of the invention shown in Figures 4 and 5 no light is employed centrally of the structure, and accordingly the inner globe may be wholly opaque while the outer globe is preferably of a character to relatively freely transmit light to the outside of the globe. The two globes are supported by a base structure indicated as a whole by the numeral 50 and provided with an extension 51 terminating in a supporting end 52 which is identical with the base portion 14 previously described except that it does not include any opening for the passage of electric wires and is provided with a smaller axial opening 53 to receive the threaded lower end of a stem 54 which extends entirely through the two globes. The stem 54 obviously projects from both the North and South Pole portions of the globe 10. The globes are supported at their lower ends by means identical with that shown in Figure 1, and the elements of such means, including the cap 21, etc., have been indicated by the same numerals as shown in Figure 1.

The means for supporting the two globes for rotation adjacent their North Pole portions may be the same as in the form of the invention described, or may be slightly different as shown in Figures 4 and 5. A relatively stiff stem 54 may be employed, in which case the semi-circular arm 15 may be eliminated. A screw 55 is externally threaded for reception in a sleeve 56 and is provided within the globe 11 with an outstanding flange 57 engaging against the inner surface of such globe. The sleeve 56 bears against a resilient washer 58 the periphery of which engages the globe 11, the latter being thus resiliently clamped between the washer 58 and flange 57 to relatively tightly fix the globe 11 relative to the screw 56 and stem 55. A washer 59 contacts with the washer 58 and with the inner surface of the globe 10 to support the North Pole portion of the latter relative to the stem 54 and the parts connected thereto.

A knurled washer 60 surrounds the sleeve 56 and is fixed thereto by a set screw 61. The operator may grasp the washer 60 to rotate the sleeve 56 and consequently the elements 55, 57 and 58 to effect rotation of the globe 11. A nut 62 is threaded on the upper end of the stem 54 and engages the upper surfaces of the elements 55, 56 and 60.

The operation of the form of the invention shown in Figures 1, 2, 3, 6 and 7 is as follows, and is substantially identical with the operation of the form of the invention shown in Figures 4 and 5, as will become apparent.

By rotating the globes relative to each other, the globe 10 by hand and the globe 11 by the knurled separator 35, interesting comparisons can be obtained between the two globes. For example, the globes may be turned to form a comparison between the areas of portions of the Eastern Hemisphere with portions of the Western Hemisphere, the Western Hemisphere being impressed on the inner globe 11 and showing through the outer globe by virtue of the transparent or translucent globe 10. Moreover, a comparison in the latitude of cities in the Eastern and Western Hemispheres may be readily obtained. It will be obvious that the entire world map may be printed on the inner globe 11, if desired, in which case comparisons as to relative sizes and positions of different places or areas in the same continent, east or west, may be readily obtained. The single meridian 48 on the inner globe 11 forms a convenient means whereby the relative longitudes of any two points may be determined. For example, if it is desired to determine whether two points in any country are located relatively north and south of each other, the globes may be relatively rotated to bring the meridian 48 to the proper position relative to the two points on the outer globe so that the approximate north and south alinement of the two points in question may be determined.

One of the most important features of the construction lies in the quick and instant manner in which relative distances between two points on the outer globe may be determined. Assuming, for example, that it is desired to ascertain the approximate distance between Jacksonville, Florida, and Spokane, Washington, a piece of string may be extended over the surface of the outer globe to define a great circle passing through the two cities in question and intersecting or passing over the Equator of the outer globe. The two globes are relatively rotated until the center 46 of the concentric lines 45 coincides with the point at which the great circle referred to crosses the Equator. Under such conditions, the great circle will intersect a number of the lines 45 and will lie perpendicular to a tangent to such intersected lines at the points of intersection thereof. The distance between the lines along the great circle thus indicated will be the true scaled distance between the lines and the actual distance represented by the scaled distances between the lines 45 will thus permit the observant to ascertain the distance between the two cities referred to. This procedure may be followed with respect to any two points through which a string may be extended over the surface of the outer globe to intersect the Equator in order that the center 46 may be moved to the latter intersecting point. The procedure referred to, of course, is applicable just as well to points lying respectively above and below the Equator, it merely being necessary that the great circle defined by the string employed pass through the Equator and through the two points between which it is desired to determine the distance. As between points lying approximately in the same zone, the lines 45 may be counted to determine the approximate distance. The coloring of certain of the lines 45 or the making of certain lines heavy as at 47 to distinguish from the remaining lines facilitates the stepping off of the distance between points, as will be apparent.

It will be obvious that the invention is not in any sense limited to the particular markings on the globes or to the portions of the maps impressed thereon, etc. This is wholly a matter of choice, and the determination of distances between points by the use of the circles 45 is practicable without any portion of the world map being impressed on the inner globe 11. Different uses of the device will suggest itself to those interested in its use. Preferably, the names of places, etc., on each globe extend at a given angle different from the angle at which the names are printed or impressed on the other globe. In this way, the approximate placing of two points, or the same point on the two globes in registration with each other will not interfere with the reading of the names. In Figure 1 the two maps have been shown in registration, and it will be noted that the names on both maps are clearly readable, being arranged at different angles. The placing of the lamp 17 within the transparent or translucent globes facilitates readings on the outer globe relative to the inner globe. If desired however the form of the invention shown in Figure 4 may be employed, the two globes being relatively rotatable as in the other form of the invention and the globes bearing the same or similar markings as may be desired. In the form of the invention shown in Figures 4 and 5 no interior illumination is employed, thus facilitating the supporting of the two globes by the stem or spindle 54 without the use of the arm 15 shown in Figure 1. In view of the elimination of the lamp bulb in Figure 4, the inner globe 11 obviously is preferably opaque, while the outer globe 10 is of such nature as to readily transmit light from the outside.

The inner globe 11 obviously being smaller than the outer globe 10, the scale of any portion of the world map shown on the globe 11 will be reduced proportionately. It is preferred that the two globes be made as close to the same size as possible to facilitate readings on the outer globe relative to markings on the inner globe.

The openings 23 (Figure 1) in the South Pole portion of each globe is provided for the purpose of permitting the insertion of the flange 27 (Figure 2) of the screw 26 and the insertion of the lamp 17. In placing the globes in position with respect to the base, it is obvious that the plate 21 will have been previously placed in position on the base portion 14, and the globe will be moved downwardly at an angle from the top of the device to permit the lamp 17 to pass through the openings 23. Thereafter the globe may be moved downwardly and swung toward its normal position, and as it approaches the base portion 14, the globe may be easily positioned to permit the flange 22 to slide into the openings 23. These openings are also provided in the form of the invention shown in Figure 4, since such opening is necessary for the insertion of the flange 57 of the screw 55.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. A world globe construction comprising a pair of closely arranged concentric globes mounted to turn independently on a common axis passing through the North and South Poles of the globes, one of said globes bearing a world map, and the other globe carrying a plurality of concentric circles spaced apart given scaled distances and having their common center on the Equator of such globe, the outer globe being formed of light transmitting material.

2. A world globe construction comprising a pair of closely arranged concentric globes mounted to turn independently on a common axis passing through the North and South Poles of the globes, one of said globes bearing a world map, and the other globe carrying a plurality of concentric circles spaced apart given scaled distances and having their common center on the Equator of such globe, said globes being formed of light transmitting material, and a light source within the inner globe.

3. A world globe construction comprising a pair of closely arranged concentric globes mounted to turn independently on a common axis passing through the North and South Poles of the globes, the inner and outer globes being respectively formed of opaque and light transmitting material, one globe bearing a world map and the other globe bearing predetermined geographical markings movable over said world map upon relative rotation of said globes.

4. A world globe construction comprising a pair of closely arranged concentric globes mounted to turn independently on a common axis passing through the North and South Poles of the globes, the outer globe being formed of light transmitting material and having a world map thereon, the inner globe being formed of opaque material and bearing predetermined geographical markings movable relative to said world map upon relative rotation of the globes.

5. A world globe construction comprising a pair of closely arranged concentric globes mounted to turn independently on a common axis passing through the North and South Poles of the globes, the outer globe being formed of light transmitting material and having a word map thereon, the inner globe being formed of opaque material and being provided approximately throughout one hemisphere thereof with a plurality of concentric circles spaced apart a predetermined scaled distance having their center lying at a point on the Equator on the inner globe.

6. A world globe construction comprising a pair of members one of which is a complete globe and the other of which is at least a section of a globe mounted outwardly of the complete globe in close proximity thereto and concentric therewith, and means for supporting said members to turn on a common axis passing through the North and South Poles of said members, said globe bearing a world map and the other member bearing predetermined geographical markings and being formed of light transmitting material, said globes being independently rotatable whereby said geographical markings may be moved relative to the world map for the ascertainment of geographical information.

7. A world globe construction comprising a pair of members one of which is a complete globe and the other of which is at least a section of a globe mounted outwardly of the complete globe in close proximity thereto and concentric therewith, means for supporting said members to turn on a common axis passing through the North and South Poles of said members, said globe bearing a world map and the other member bearing predetermined geographical markings and being formed of light transmitting material, said members being independently rotatably whereby said geographical markings may be moved relative to the world map for the ascertainment of geographical information, said globe being formed of light transmitting material, and a light source within said globe.

8. A world globe construction comprising a pair of members one of which is a complete globe and the other of which is at least a section of a globe mounted outwardly of the complete globe in close proximity thereto and concentric therewith, and means for supporting said members to turn on a common axis passing through the North and South Poles of said members, said globe bearing a world map and the other member bearing a map of a hemisphere bounded by meridian lines and being formed of transparent material, said members being independently rotatable for movement of said hemispherical map over said world map for the ascertainment of geographical information.

WALTER F. KOCH.